United States Patent
Avrahami

(10) Patent No.: US 10,313,626 B2
(45) Date of Patent: Jun. 4, 2019

(54) TECHNIQUES AND SYSTEM FOR MULTIPLE DISPLAY MEDIA PRESENTATIONS

(71) Applicant: INTEL CORPORATION, Santa Clara, CA (US)

(72) Inventor: Daniel Avrahami, Mountain View, CA (US)

(73) Assignee: INTEL CORPORATION, Santa Clara, CA (US)

( * ) Notice: Subject to any disclaimer, the term of this patent is extended or adjusted under 35 U.S.C. 154(b) by 37 days.

(21) Appl. No.: 14/129,938

(22) PCT Filed: Jun. 24, 2013

(86) PCT No.: PCT/US2013/047336
§ 371 (c)(1),
(2) Date: Dec. 28, 2013

(87) PCT Pub. No.: WO2014/209264
PCT Pub. Date: Dec. 31, 2014

(65) Prior Publication Data
US 2015/0222843 A1    Aug. 6, 2015

(51) Int. Cl.
*H04N 21/41*    (2011.01)
*G06F 3/14*    (2006.01)
*H04N 5/765*    (2006.01)
*H04N 21/422*    (2011.01)
*H04N 21/4223*    (2011.01)
*H04N 21/43*    (2011.01)
(Continued)

(52) U.S. Cl.
CPC ........... *H04N 5/765* (2013.01); *G06F 3/1423* (2013.01); *G11B 27/11* (2013.01); *G11B 27/34* (2013.01); *H04N 5/775* (2013.01); *H04N 5/85* (2013.01); *H04N 21/4122* (2013.01); *H04N 21/4223* (2013.01); *H04N 21/42202* (2013.01); *H04N 21/4307* (2013.01); *H04N 21/8126* (2013.01)

(58) Field of Classification Search
CPC ......... G09G 2300/02; G09G 2300/023; G09G 2300/026; G06F 3/1423; G06F 3/1446; H04N 21/4122; H04N 21/42202
See application file for complete search history.

(56) References Cited

U.S. PATENT DOCUMENTS

2002/0057799 A1* 5/2002 Kohno ............. G11B 20/00086
380/228
2002/0114493 A1    8/2002 McNitt et al.
(Continued)

OTHER PUBLICATIONS

International Search Report and Written Opinion received for PCT Patent Application No. PCT/US2013/047336, dated Mar. 24, 2014, 12 pages.

*Primary Examiner* — Gene W Lee

(57) ABSTRACT

In one embodiment, an apparatus includes a processor circuit; a media distribution component for execution on the processor circuit to manage presentation of a media presentation on multiple electronic displays, the media presentation comprising a video part and an auxiliary data part, the auxiliary data part comprising sensor data corresponding to the video part, the media distribution component to manage presentation of the video part on an external display and the auxiliary data part on an integrated display. Other embodiments are disclosed and claimed.

25 Claims, 10 Drawing Sheets

(51) Int. Cl.
    *H04N 21/81*     (2011.01)
    *G11B 27/11*     (2006.01)
    *G11B 27/34*     (2006.01)
    *H04N 5/775*     (2006.01)
    *H04N 5/85*     (2006.01)

(56) References Cited

U.S. PATENT DOCUMENTS

| | | | |
|---|---|---|---|
| 2002/0120392 A1* | 8/2002 | Stratton | B64F 1/002 |
| | | | 701/120 |
| 2003/0085997 A1* | 5/2003 | Takagi | G11B 27/031 |
| | | | 348/143 |
| 2003/0177503 A1* | 9/2003 | Sull | G06F 17/30796 |
| | | | 725/112 |
| 2007/0271525 A1 | 11/2007 | Han et al. | |
| 2011/0237189 A1 | 9/2011 | Ye et al. | |
| 2012/0158802 A1* | 6/2012 | Lakshmanan | H04N 21/85406 |
| | | | 707/822 |
| 2012/0172088 A1 | 7/2012 | Kirch et al. | |
| 2012/0176503 A1* | 7/2012 | You | H04N 1/00411 |
| | | | 348/220.1 |
| 2013/0033435 A1 | 2/2013 | Raveendran et al. | |
| 2013/0094590 A1* | 4/2013 | Laksono | H04N 19/44 |
| | | | 375/240.25 |

* cited by examiner

*Media Distribution System 100*

TECHNIQUES AND SYSTEM FOR MULTIPLE DISPLAY MEDIA PRESENTATIONS

TECHNICAL FIELD

Embodiments described herein generally relate to digital camera recording and management of digital display devices.

BACKGROUND

Video recording is becoming a ubiquitous activity with the advances in digital technology. Certain cameras, often referred to as "Action Cams," which are used for capturing video while doing sports such as cycling, skiing, snowboarding, etc. are becoming increasingly popular. Such cameras can be attached to a helmet, handlebar, or other object and give users a hands-free ability to capture continuous video. In addition to capturing video, users are able to record sensor-data during the activity, such as accelerometer, gyroscope, global positioning sensor (GPS), and altimeter data. Such sensor-data can be recorded by the camera, or by using a separate device such as a smartphone or sensor pack. These additional data can be used to provide additional information about the video such as the path taken during a bike-ride, or can be used to help the user identify moments of interest in the video.

Subsequent to recording of an event using a camera and additional sensors a user may decide to view the recorded video on a user device such as a computer display, notebook, or tablet device. The user may additionally be provided with other captured information such as a physical path traveled during the recording of the data. However, viewing video and other recorded information may provide a less than ideal experience for the user, especially when the display device presents a small viewing area.

Accordingly, there may be a need for improved techniques and apparatus to solve these and other problems.

DETAILED DESCRIPTION

Various embodiments are directed to enhancing the viewing of media presentations that include multimedia information such as video information. The term "video information" as used herein generally refers to information used to create, modify or manage video suitable for presentation on an output device, such as an electronic display. A video may generally comprise a sequence of images typically depicting motion, such as a movie, television show, animation, and so forth. A video may include a digital recording that contains a video track or video file, and may optionally include or be associated with other recorded data, such as an audio track or audio file that contains audio data recorded with the video data. The term "media presentation" as used herein refers to multiple data sets that include a video part and a non-video part other than an audio part, the non-video part herein termed "auxiliary data" or "auxiliary data part." In a given media presentation the video data and auxiliary data are related in that they reflect data recorded from a common event or at a common location over the same period. Both the video part and auxiliary data part are capable of presentation as visual content on a digital display. In the present embodiments, techniques are disclosed for distributing the media presentation for simultaneous viewing and interaction with different parts of the media presentation among multiple devices or destinations.

As detailed below, consistent with various embodiments, a video part of the media presentation that includes video data and optional audio data may be distributed to a first device while auxiliary data of the media presentation such as sensor data that was collected by one or more sensors together with video data may be distributed for presentation on a separate device.

Figure 1:
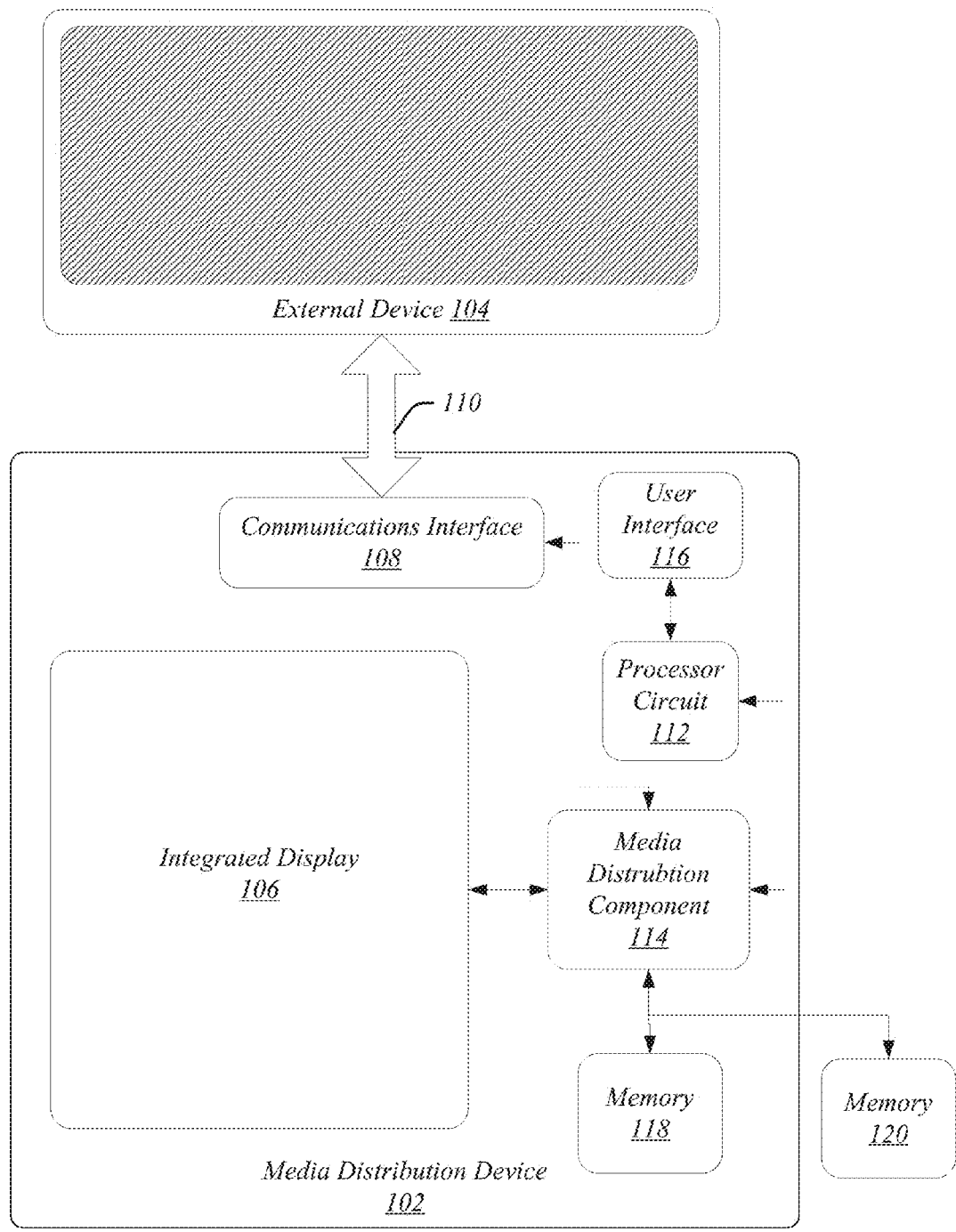
FIG. 1 illustrates a block diagram for an exemplary system.

FIG. 1 illustrates a block diagram for a media presentation system 100 consistent with the present embodiments. The media distribution system 100 is generally directed to processing video and other data to enhance viewing of a video at a first device by presenting correlated auxiliary data at a second device simultaneously with the video. The media distribution system 100 may organize the display of multiple types of data including video over multiple displays, where the multiple types of data are recorded at a common event. For example a set of action cam video data and related accelerometer data may be recorded at an event such as a motorcycle ride or downhill skiing run and may be stored in one or more files. The media distribution system 100 may then retrieve the video data and related accelerometer data, allocate the video data for presentation on a first display device, and allocate the accelerometer data for display on a second display device. The media distribution system 100 may further facilitate various types of control and manipulation of video displayed on the first display device via user interaction with the second display device as detailed below.

In particular, the media distribution system 100 includes a media distribution device 102 and external device 104. In the example of FIG. 1, each of the media distribution device 102 and external device 104 include a digital display capable of presenting digital files in visual format such as video data, still images, graphical and other visual images that may be derived from data files of a media presentation. The media distribution device 102, which includes a digital display that is referred to herein as an integrated display 106, may be a general purpose computer, a laptop computer, notebook computer, netbook computer, tablet device, smartphone, digital television, or other digital device. The embodiments are not limited in this context.

The media distribution device 102 is communicatively coupled to the external device 104 via the communications interface 108, which is capable of establishing the communications link 110 as illustrated. In various embodiments the communications link may be a wireless or wired link. When implemented as a set of components that are coupled through wired communication links, for example, the media distribution system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a set of components that are coupled through wireless communication links, for example, the media distribution system 100 may include wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

The media distribution device 102 further includes a processor circuit 112, user interface 116 and media distribution component 114. In operation the media distribution component 114 is operative to distribute different parts of a media presentation for display at different locations such as at the integrated display 106 of the media distribution device 102 and the external device 104. In particular, the media distribution component may distribute an auxiliary data component of a media presentation to the integrated display 106 and may direct the distribution of a video component corresponding to the auxiliary data component to an external display, where the auxiliary data component and corresponding video component constitute respective auxiliary data and video data collected at the same location and over the same time period.

Responsive to input received at the user interface 116 the media distribution component 114 may identify and retrieve various parts of a media presentation, which may be stored in the memory 118, internal to the media distribution device 102, or in a memory 120 that is located external to the media distribution device 102. The media distribution component 114 may also facilitate control of video presented on the external device 104 through user interaction with the media distribution device 102 and in particular through user interaction with visual content presented on the integrated display 106.

The media distribution component 114 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In particular embodiments, the media distribution component 114 forms part of a media consumption application that may be resident on a media distribution device such as a portable wireless device. When the media distribution component is invoked or active such a media consumption application allows a user to view media such as videos and to distribute auxiliary data such as sensor data associated with a video for viewing on the integrated display 106. Such a media consumption application may provide any convenient user interface in the media distribution device 102 to allow a user to select a media file (media presentation) for viewing and to distribute part of the media presentation to an external destination (display device, or display) either automatically or in response to further user input. The external destination may correspond to the address or name of an external device that has an external display and is capable of communications with the media distribution component. A non-exclusive list of examples of user interface include a mouse, keyboard, keypad, touchpad, touch screen, or voice recognition component.

Figure 2:
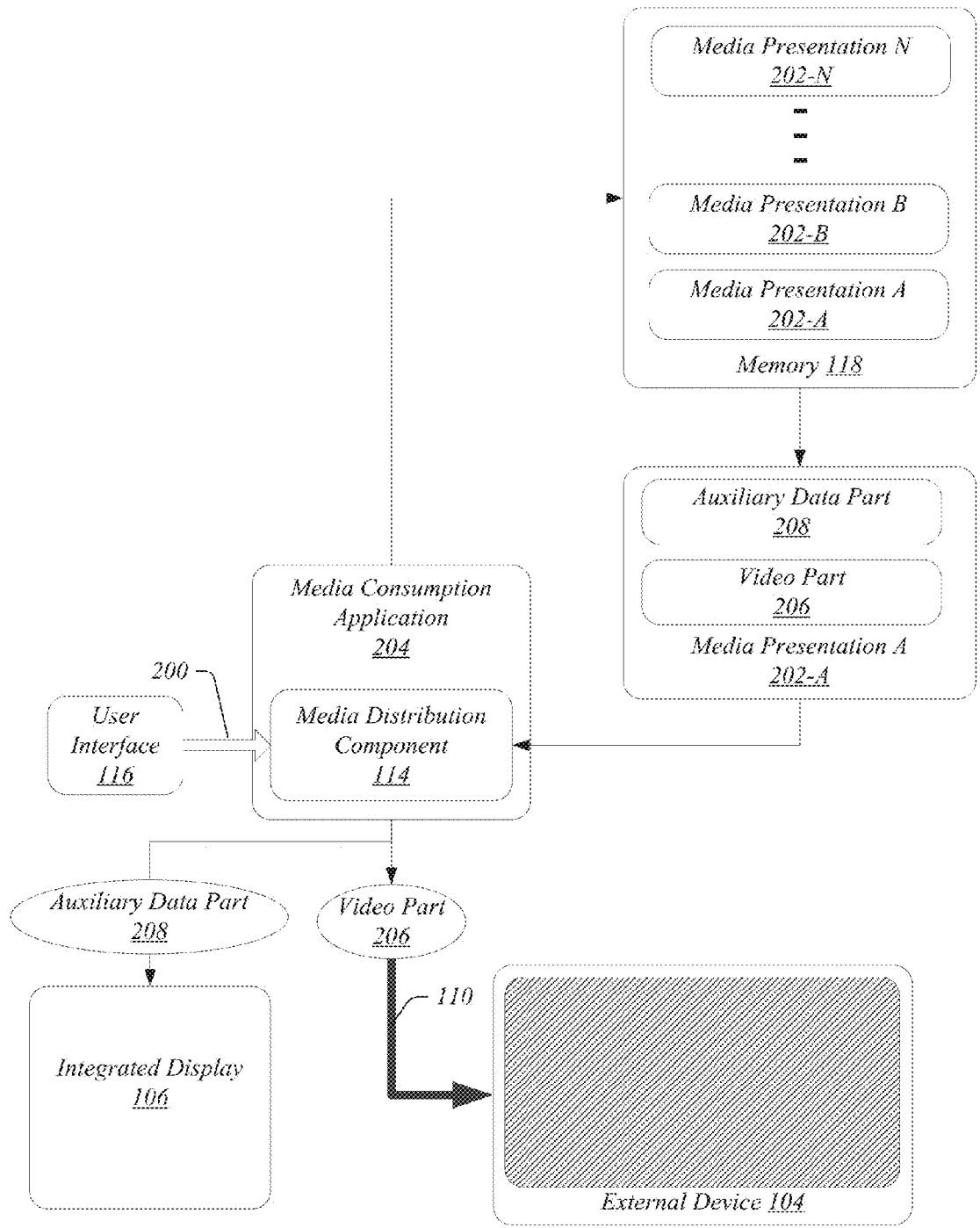
FIG. 2 illustrates operation of a first exemplary system.

FIG. 2 depicts details of operation of the media distribution component 114 consistent with various embodiments. For clarity, several components of the media distribution system 100 are omitted. In FIG. 2 user input 200 is received from the user interface 116 by the media distribution component 114. The user input 200 may be, for example, one or more operations that include launching a media consumption application 204, selecting a media presentation, and/or designating target devices (destinations) to present different parts of the media presentation. The target devices may be, for example, external displays that are external to a media distribution device that a user is operating such as a tablet device, smartphone, or computer. For example, a user may select a media presentation associated with a recent motorcycle ride that was captured by an action cam. In the example of FIG. 2, the user selects a presentation labeled Media Presentation A 202-A. In some implementations, the media consumption application 204 may present a menu, listing, set of icons, or other means to indicate selectable media presentations for viewing. Once the Media Presentation A 202-A is selected, the media distribution component 114 may retrieve from memory 118 the appropriate media presentation. As illustrated, the memory 118 may store multiple media presentations Media Presentation A 202-A, Media Presentation A 202-B . . . Media Presentation A 202-N, where A, B, and N represent any non-zero integer.

As further shown in FIG. 2, the retrieved media Media Presentation A 202-A includes multiple parts, including a video part 206 and auxiliary data part 208. The video part 206 may correspond to a video track (or video file) that is stored together with an audio track recorded at the same time as the video track. For example, a single device that houses a camera and one or more data sensors may capture simultaneous video, audio, and other sensor data. Alternatively, a camera device and a separate sensor-data capture device such as a smartphone may be employed to simultaneously record video and other data. Subsequently, the video data and sensor data (auxiliary data) may be linked by embedding the sensor data as metadata in a video file that includes the video data or by associating a video file and related sensor data file(s).

As noted, the auxiliary data part 208 may include one or more sets of auxiliary data that may include sensor data recorded at the same time as the video track. In some instances, in addition to sensor data, the auxiliary data part may include a listing or index of keyframes of a video or video track as discussed below.

Figure 3:
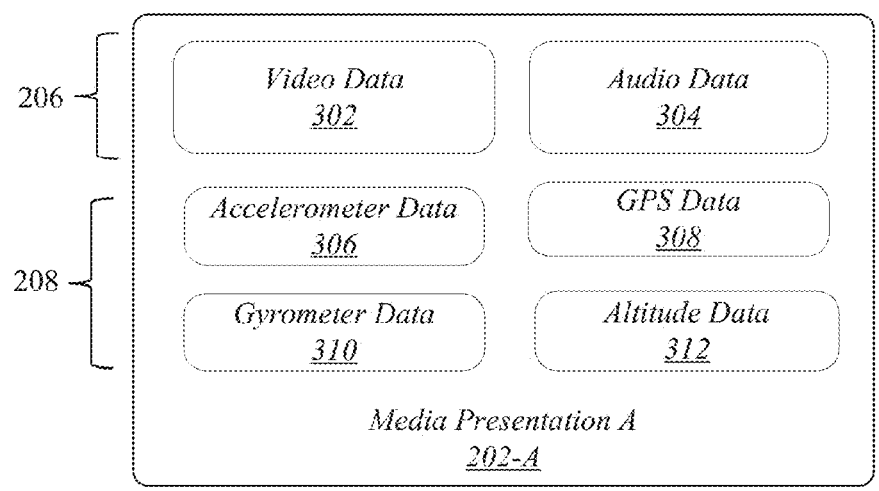
FIG. 3 illustrates an exemplary data structure.

FIG. 3 provides additional detail of one arrangement of the Media Presentation A 202-A. The video part 206 includes video data 302 and audio data 304. The auxiliary data part 208 includes accelerometer data 306, global positioning sensor (GPS) data 308, gyroscope data 310, and altitude data 312. In some examples the data 302-312 may be stored within a common file or may be stored in separate files.

In the example of FIG. 2, once the Media Presentation A 202-A is retrieved, the media distribution component 114 forwards the video part 206 for presentation at a first destination so that video data captured in the video part and optionally audio data may be presented to a user. In this case, the first destination is an external display, that is, is a display housed in a device that is external to the media distribution device that houses the media distribution component 114. As particularly shown in FIG. 2, the video part 206 is forwarded over the communications link 110 to the external device 104. The media distribution component 114 also forwards the auxiliary data part 208 to another destination for presentation on a display. In this case, the auxiliary data part 208 is forwarded for presentation on the integrated display 106 which is part of the media distribution device 102. Thus, for example, a video recorded and stored as part of Media Presentation A 202-A may be viewed on the external device 104, which may be a large screen device, such as a television, while other data (auxiliary data part 208) is loaded for viewing onto an integrated display 106, which may be part of a portable device such as a tablet computer, smartphone, or notebook computer, to name a few examples.

In various embodiments the media distribution device 102 may link to an external device or devices that constitute possible target destinations for playing a part of the media presentation via known protocols or techniques. The media distribution device may, for example, form part of a local wired or wireless network. Examples of local networks include a local area networks (WLAN), such as those operating under the Institute of Electrical and Electronics Engineers (IEEE) 802.11 series of standards (collectively referred to as "Wi-Fi"), and Intel® Wireless Direct (WiDi) protocol, Bluetooth® protocol, or other peer-to-peer (P2P) connection. In other examples, the media distribution device 102 may be link to external devices over a data network, such as the Internet or a wired local area network.

Consistent with some embodiments, the media distribution device 102 may be coupled over the communications link 110 to an external device before the media consumption application 204 is launched. For example, the media distribution device 102 may discover and form a wireless link to other devices in a local wireless network when the media distribution device 102 and external devices are active. In other embodiments, the media distribution device 102 may attempt to connect to an external device after the media consumption application 204 is launched and after a media presentation is selected.

In various embodiments as detailed in the figures to follow, a user may interact with video content presented on the external device 104 using auxiliary data content presented on the digital display. Consistent with various embodiments the media distribution component 114 may organize the presentation of different parts of a media presentation in different ways. As noted, the media distribution component 114 may form part of a media consumption application that is resident on a local device (media distribution device) that houses an integrated display and optionally contains other user interfaces through which a user may guide a media presentation. The media consumption application such as media consumption application 204 may present a menu of external devices that the local device may potentially link to in order to distribute a portion of the media presentation such as a video part. In some examples, the media consumption application may detect and apprise a user as to what external devices in a local network are currently communicatively linked to the local device. The user may then select through an interface provided on the media distribution device 102 a desired external device to present the video. In some implementations, the media distribution component 114 (via the media consumption application) may allow the user may designate the local device to present the video and to designate an external device to present auxiliary data. In some implementations, if no external devices are currently communicatively linked to the local device the media distribution component 114 may distribute all parts of the media presentation for display on the local device, such as the integrated display 106. In this case, separate windows may be generated to present video data and other data, such as sensor data recorded simultaneously with the video data.

Figure 4A:
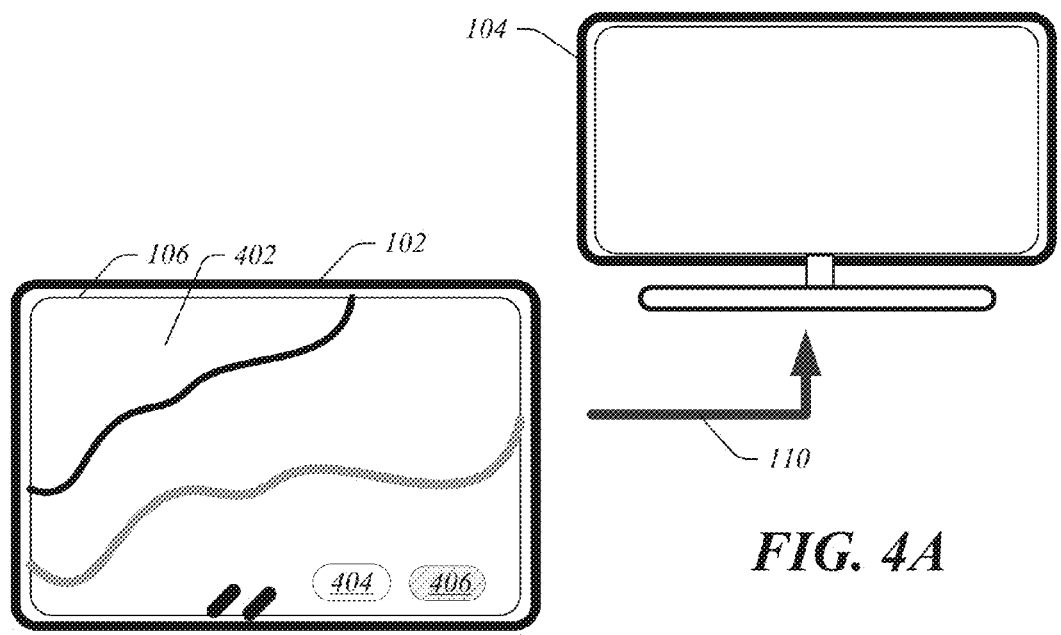
FIGS. 4A and 4B illustrate one use scenario of an exemplary system.
Figure 4B:
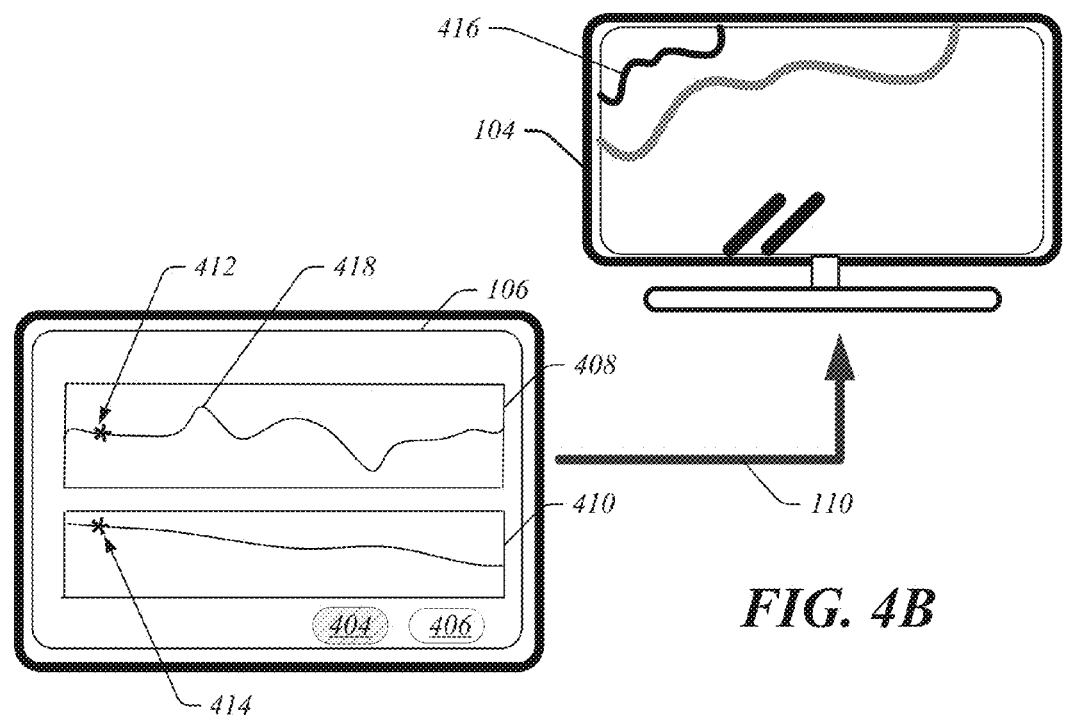

FIGS. 4A and 4B depict one scenario for initially distributing a video presentation among multiple different displays following the example of FIGS. 1-3. In the scenario depicted in FIG. 4A, when a user selects a media presentation the media consumption application 204 retrieves the file(s) associated with the designated media presentation via media distribution component 114. In one example, the media presentation may involve video and other sensor data recorded while skiing. The media distribution component 114 may send the video data 302 for initial presentation on the integrated display 106. In one particular example, the first frame 402 of the video data 302 is drawn on the integrated display 106, which may be a display of a tablet computer. In addition to the video data 302, additional controls such as Play/pause icon 404 etc. may be shown on the integrated display 106 as well as a mechanism to designate a target destination to which the video is to be forwarded for playing. For example, the media distribution component 114 may generate an icon, button, or other object that is displayed on the integrated display 106 that indicates a target device and/or action to take, such as a Show on TV icon 406. In the instance shown in FIG. 4A the user has just engaged the Show on TV icon 406 before the Play/pause icon 404 is selected. At this point no video is displayed on the external device 104.

Subsequently, in response to the selection of the Show on TV icon 406 the media distribution component 114 may send the first frame 402 of the video data 302 over the communications link 110, which is then drawn on the external device 104, as illustrated in FIG. 4B. At this time, the presentation of the video part 206 is paused at a single video frame such that consecutive images are not generated on the integrated display 106 (nor on the external device 104). Instead, the media distribution component 114, having determined that the video part 206 is to be shown on the external device 104, forwards the auxiliary data part 208 for presentation on the integrated display 106. Subsequently, one or more windows or fields are displayed on the integrated display 106, where each field contains a visual representation of a set of sensor data, such as accelerometer data 306, GPS data 308, and so forth.

In the example of FIG. 4B, an accelerometer data view window 408 and altitude data view window 410 are presented on the display 106, which present respective graphical depictions of accelerometer data 306 and altitude data 312. Each window may present, for example, a plot of respective accelerometer or altitude sensor data as a function of time. When the user subsequently selects "play" be selecting the Play/pause icon 404, the media distribution component 114 may send a signal to begin streaming the video part 206 to the external device 104, which may constitute streaming the video data 302 and audio data 304. At the same time, respective markers 412, 414 are provided in respective accelerometer data view window 408 and altitude data view window 410, which markers are synchronized to the video content of the video part 206 of the media presentation being shown on the external device 104. Accordingly, in the instance illustrated in FIG. 4B, the markers 412, 414 provide a visual indication of a respective accelerometer data entry and altitude data entry corresponding to the video frame 416 presented at that instance on external device 104. Synchronization may be facilitated, for example, with the aid of time stamps in which each data entry of auxiliary data as well as video data is time stamped. Accordingly, the video frame 416, marker 412, and marker 414 may all present data collected at the same instance while skiing. Subsequently, when different video frames are displayed on the external device 104, the markers 412, 414 move to positions within the respective accelerometer data view window 408 and altitude data view window 410 that correspond to a time stamp of the video frame presented at any given instance.

Once the accelerometer data view window 408 and altitude data view window 410 are presented on the display 106, the user may interact with the media distribution device 102 in various ways to experience the media presentation being shown on the external device 104 and media distribution device 102. For example, after video begins streaming on the external device 104, the user may simply watch both display 106 and external device 104. In this manner, the user may experience a continuous visual perspective of a skier during the recorded skiing event while being simultaneously apprised of other information such as the acceleration and altitude associated with each instance of video data shown on the external device 104. In addition, the user may engage the Play/pause icon 404 as desired to freeze display of video on the external device 104 and freeze movement of markers 412, 414.

In some embodiments, the media consumption application 204 may also provide the ability for a user to scroll through a media presentation while the media presentation is distributed among different devices for viewing. Following the example of FIGS. 4A-4B, an auxiliary data view window presented on the integrated display 106, for example accelerometer data view window 408 or altitude data view window 410, may be scrollable by use of user touch, a mouse, keypad, virtual fast forward or reverse icons, or other indicating device. Following the example of FIG. 4B, as the user performs a scrolling action on the media distribution device, the markers 412 and 414 move along the time axis (horizontally) within the respective accelerometer data view window 408 or altitude data view window 410, while the video frame presented on the external display 104 is updated according to the time indicated in the accelerometer data view window 408 or altitude data view window 410. Thus, the time axis presents a visual representation of the time stamp for each recorded data point (data entry) in the respective data windows as well as the currently displayed video frame.

Thus, a user may employ the media distribution device 102 as a control device to rapidly scroll forward or backward in time to simultaneously view sensor data on the integrated display 106 and contemporaneously recorded video corresponding to the sensor data. This may be especially useful to enhance a user's experience of a recorded event. For example, the user may identify the data entry 418 in the accelerometer data view window 408, which represents a point of maximum acceleration. The user may wish to view the circumstances that caused such large acceleration and accordingly may rapidly scroll to that point within the accelerometer data view window 408, at which point a corresponding video frame may be displayed on the external device 104. The user may then choose to play video in the immediate time vicinity surrounding the data entry 418 to experience the skier's view of terrain that caused such rapid acceleration.

In other embodiments, the media distribution component 114 may facilitate viewing of different portions of a video part of a media presentation among different devices. Referring again to FIG. 2, if the user selects the Media presentation A 202-A for viewing, and the first video frame is loaded to the integrated display 106, the user may first selects a Play/pause icon 404 before selecting the Show on TV icon 406. In this case, the media distribution component directs the video part 206 to be played on the integrated display 106. The user may, for example, wish to view initial portions of a ski video on a tablet device before certain interesting video portions arise. Later, at a given point in the video the user may wish to view the video part 206 on a larger device such as the external device 104, at which point the Show on TV icon 406 is engaged. As a result, the media distribution component 114 directs the video to be streamed to the external device for presentation starting with the video frame that is displayed on the integrated display 106 at the time the Show on TV icon 406 is engaged. The media distribution component 114 then reconfigures the integrated display to present corresponding auxiliary data in the manner discussed above with respect to FIGS. 4A and 4B.

Figure 5:
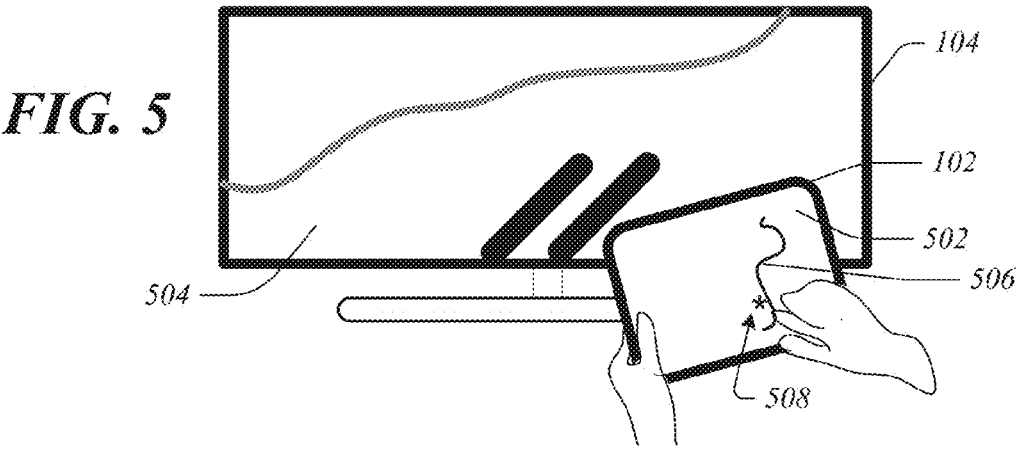
FIG. 5 depicts another use scenario consistent with various embodiments.

FIG. 5 depicts another use scenario of the media distribution system consistent with the present embodiments. In this example, a media distribution component is configured to present GPS data 502 on the media distribution device 102, which may be in the form of a map and route, and is also configured to distribute video data 504 for presentation on the external device 104. The GPS route 506 may correspond to GPS data collected simultaneously with the video data 504 presented on the external device 104. When the user touches a point or data entry on the GPS route 506 indicated by the marker 508, the video data 504 is automatically indexed to present a video frame that corresponds to the same time stamp as that of the data entry. Accordingly, the user may select any point along the GPS route 506 to display a video frame corresponding to video recorded at the location indicated by the selected point.

Figure 6:
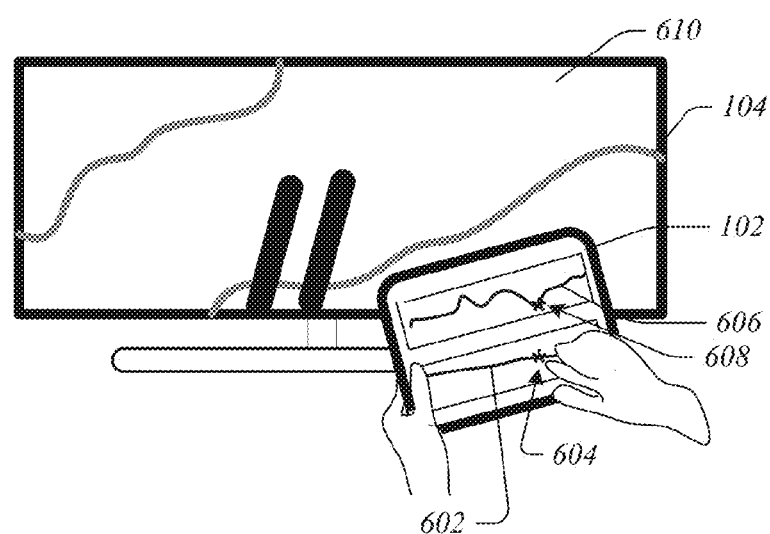
FIG. 6 depicts a further use scenario consistent with other embodiments.

FIG. 6 depicts another use scenario of the media distribution system consistent with the present embodiments. In this example, a media distribution component is configured to present on the media distribution device 102 the altitude data 602 and acceleration data 606 similarly to the scenario of FIG. 4B. When the user touches a point corresponding to a data entry on the altitude data 602, a marker 604 is shown at the selected location on the altitude data 602. At the same time, the marker 608 moves to a location corresponding to the same time as that of the marker 604. The video data 610 is automatically indexed to present a video frame that corresponds to the same time as that of the data entry of marker 604. Accordingly, the user may select any point along the altitude data 602 or acceleration data 606 to display a video frame of video recorded at the time indicated by the selected point.

In further embodiments, the media distribution component 114 may be operative to allow a user to "jump" through a video part of a media presentation. In particular, a media presentation may include a video part, auxiliary data part, and a keyframe index (which may be included in the auxiliary data part) that provides a listing of select frames (keyframes) of a video part. In one example, one or more keyframes may each represent a respective point in time in which a large change in sensor data value takes place for sensor data collected concurrently with video recording of the video part. Once generated, the keyframe index may then be employed by a user to view certain select portions or instances of the video in question. For example, the keyframe index may be presented on an integrated display of a media distribution device, which allows the user to guide the presentation of video on an external device by selection of keyframes. In particular, a left or right swiping touch gesture on the integrated display may cause the media distribution component to skip the video image presented on an external display between a first video frame corresponding to a first entry in the keyframe index to a subsequent video frame corresponding to a next entry in the keyframe index.

This may allow a user to skip between different images in a video based on key instances of sensor data in a more automated and rapid fashion than by manual identification and selection of sensor data entries within a sensor data window. For example, referring again to FIG. 4B, the accelerometer data view window 408 includes multiple instances in which substantial changes in acceleration occur. Consistent with some embodiments, a keyframe index may be generated based upon the identification of these instances. A user may subsequently load keyframe data or interact with a keyframe field, such that the user steps (by swiping motion, or other motion) through the keyframe index to select video frames of interest instead of selecting by touch interaction certain sensor data entries, such as accelerometer data points (entries) within the accelerometer data view window.

Figure 7:
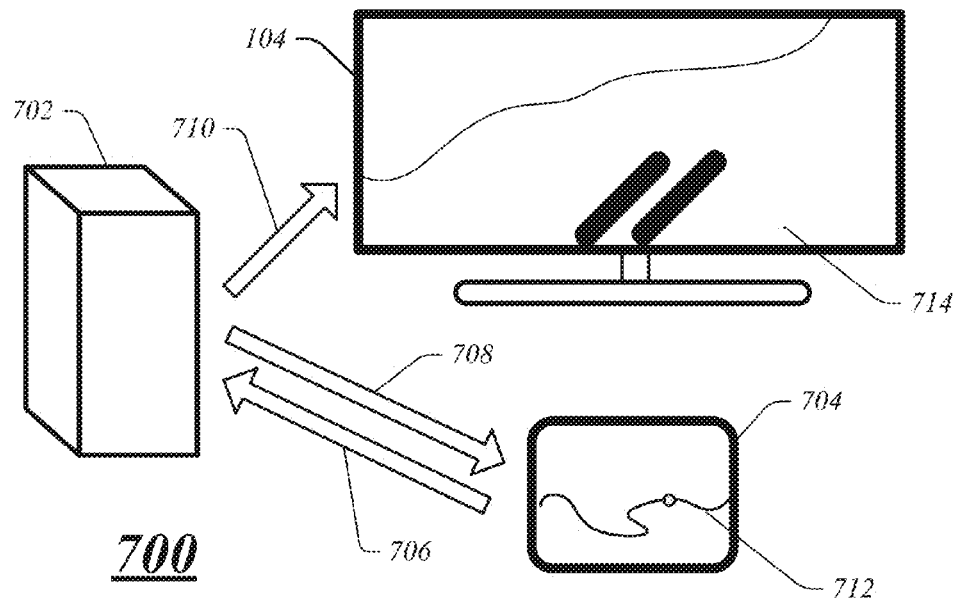
FIG. 7 illustrates operation of a second exemplary system.

FIG. 7 illustrates a media distribution system 700 according to an additional embodiment. In this embodiment a computer 702 is configured to store one or more media presentations. The computer 702 may form part of a local network with the media distribution device 704 and the external device 104 via either a wired or wireless link. The media distribution device 704 is configured with a media distribution component, such as the media distribution component 114. In operation, when a media presentation is to be displayed, the media distribution device 704 sends a request message 706 to the computer 702, which sends different portions of the media presentation to the media distribution device 704 and external device 104. In particular, the media distribution device 704 directs the computer 702 to stream a video part 710 of a media presentation to the external device 104 and to forward an auxiliary data part 708 to the media distribution device 704. A user of the media distribution device 704 may subsequently direct the display of a video frame 714 or succession of video frames on the external device 104 by selection of a time stamped entry on the GPS image 712 shown on the media distribution device 704. In one example, the selection of an entry by the user may cause the media distribution component to direct a signal to the computer 702 to stream the related video frame to the external device 104 corresponding to the time stamp of the selected entry.

Figure 8:
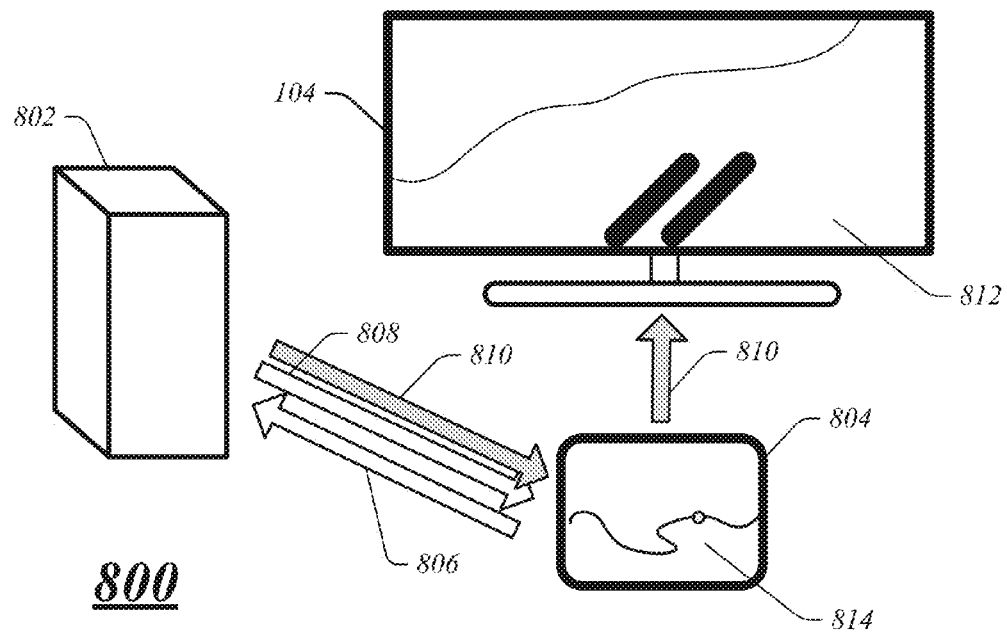
FIG. 8 illustrates operation of a third exemplary system.

FIG. 8 illustrates a media distribution system 800 according to a further embodiment. In this embodiment a computer 802 is configured to store one or more media presentations. The computer 802 may also form part of a local network with the media distribution device 804 and the external device 104 via either a wired or wireless link. The media distribution device 804 is configured with a media distribution component, such as the media distribution component 114. In operation, when a media presentation is to be displayed, the media distribution device 804 sends a request message 806 to the computer 802, which sends different portions of the media presentation between the media distribution device 804 and external device 104. In this example, the media distribution device 804 directs the computer 802 to send the entire media presentation to be presented to the media distribution device 804, which then forwards a video part 810 of a media presentation to the external device 104 and forwards an auxiliary data part 808 to its own display. A user of the media distribution device 804 may subsequently direct the display of video content 812 on the external device 104 based upon interaction with auxiliary data content 814 shown on the media distribution device 804, in accordance with the procedures generally outlined above with respect to FIGS. 4A-7.

Figure 9:
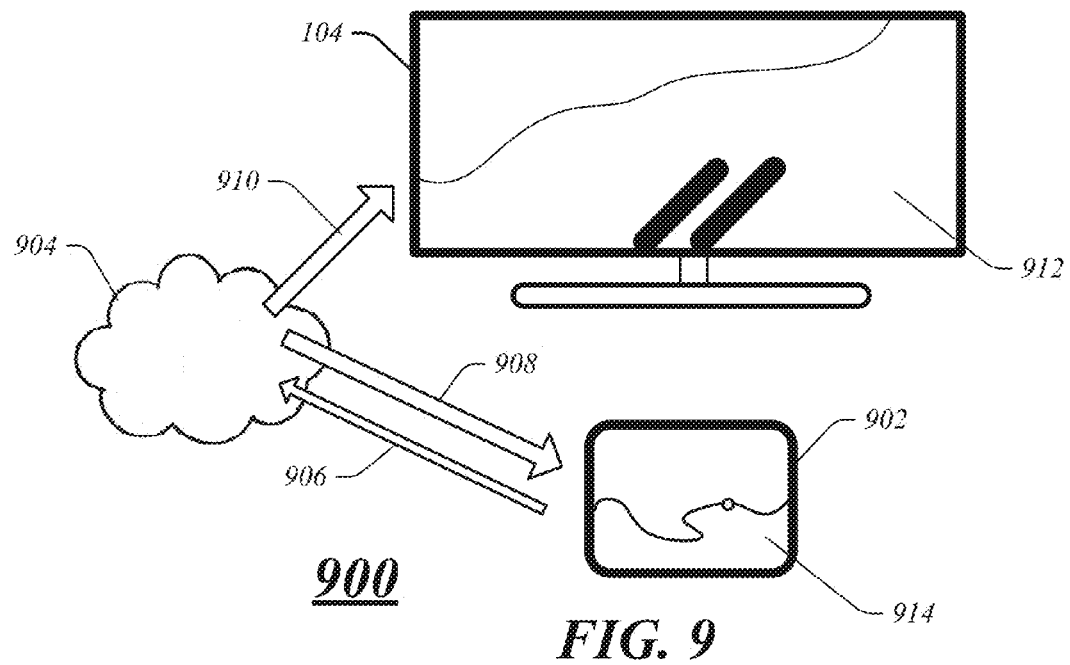
FIG. 9 illustrates operation of a fourth exemplary system.

FIG. 9 illustrates a media distribution system 900 according to yet another embodiment. In this embodiment a media distribution device is configured to retrieve media presentations from a remote storage 904 which may be a cloud-type storage device in which the storage of the media presentations is provided in one or more locations accessible through a data network such as the Internet.

In operation, when a user of the media presentation requests a media presentation to be displayed, the media distribution device 902 sends a request message 906 to a target location (remote storage 904) which may be provided by a cloud-based storage service. In the example of FIG. 9, a media distribution component of the media distribution device 902 directs the retrieval of the remotely stored media presentation in the following manner. The remote storage 904 is directed to stream the video part 910 of the media presentation to a destination corresponding to the external device 104. The remote storage 904 is further directed to send the auxiliary data component 908 to the media distribution device 902, which forwards the auxiliary data component 908 to its own display for presentation. Again, the user of the media distribution device 902 may manipulate auxiliary data content 914 presented on its display to control the presentation of video content 912 on the external device 104.

Figure 10:
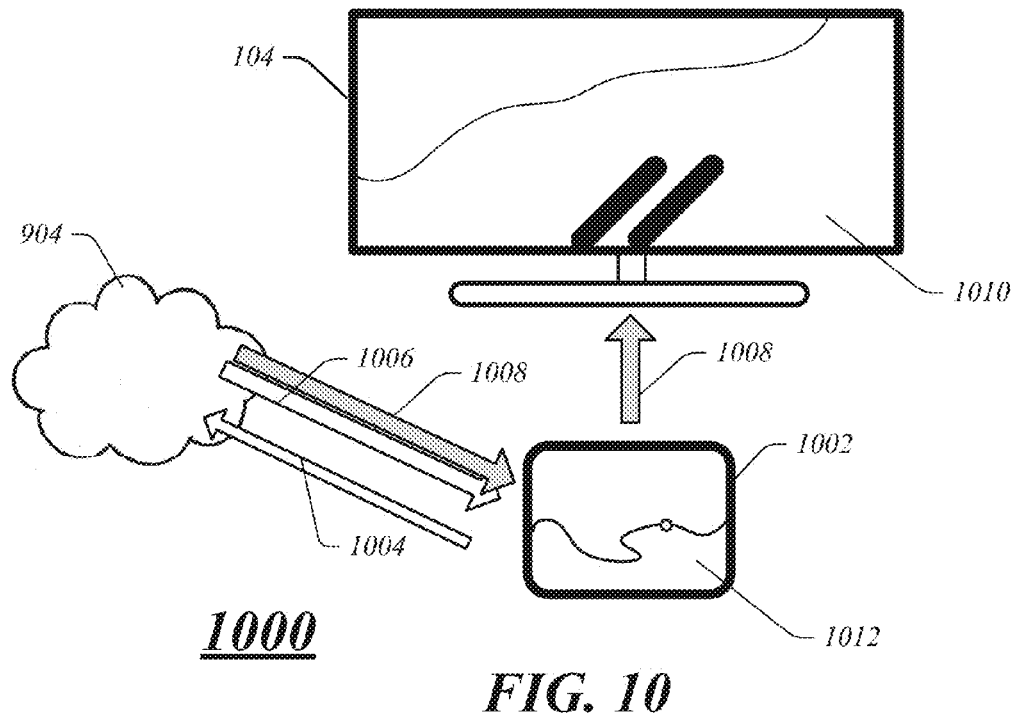
FIG. 10 illustrates operation of a fifth exemplary system.

FIG. 10 presents one additional media distribution system 1000 according to an additional embodiment. In this embodiment in operation, when a media presentation is requested by the user, the media distribution device 1002 sends a request message 1004 to the remote storage 904, which directs the remote storage 904 to send the entire media presentation to be presented to the media distribution device 1002. In particular, a video part 1008 is sent from the remote storage 904 to the media distribution device 1002, which forwards the video part 1008 of a media presentation to the external device 104. An auxiliary data part 1006 is also sent to the media distribution device 1002, which forwards auxiliary data part 1006 to its own display. A user of the media distribution device 1002 may subsequently manipulate video content 1010 on the external device 104 based upon interaction with auxiliary data content 1012 shown on the media distribution device 1004, in accordance with the procedures outlined above with respect to FIGS. 4A-7.

The systems generally depicted in FIGS. 7-10 may be especially useful to direct a multi-device media presentation in scenarios in which the media distribution device that controls the media presentation is a small-form-factor device such as a tablet device, mini-tablet, or smartphone, or similar device that may have limited storage capacity. In such a case, storage of large numbers of media presentations locally on the media presentation device may not be possible or desirable. In further embodiments, in order to optimize user experience, once a first media presentation is selected and distributed for play among multiple different devices, subsequent media presentations may be played in similar fashion with minimal user interaction. For example, referring again to FIG. 2, in a first instance the media consumption application 204 loads the Media presentation A 202-A in response to user input, and the video part 206 is played on the external device 104 synchronously with presentation of the auxiliary data part 208 on the integrated display 106. Subsequently a user may continue to select one or more of the Media presentation B 202-A, . . . , Media presentation N 202-N for playing. In each case, when the user selects an additional media presentation, the media distribution component 114 may automatically send the respective video part of the selected media presentation on the external device 104 and send the corresponding auxiliary data part for presentation on the integrated display 106.

In addition to the ability to distribute different parts of a media presentation among different devices, a media distribution component such as the media distribution component 114 may synchronize and adjust the presentation in real time of the different parts of a media presentation at the different devices. For example, referring again to FIG. 1, in embodiments in which the communications link 110 is a wireless link communications between the media distribution device 102 and external device 104 may be disrupted upon occasion while content such as video part of a media presentation is being streamed from the media distribution device 102 to the external device 104. In one implementation, if only transmission/reception of video data packets is interrupted and the media distribution device 102 still recognizes the external device 104, the media distribution component 114 may continue to advance the frames of the video part to be wirelessly sent to the external device 104 and a marker of an auxiliary data window shown on the integrated display 106 may continue to advance in real time. Subsequently, when successful video data packet transmission to external device 104 resumes, the currently scheduled frame is sent to and received by the external device. In this manner, a portion of the video part of the media presentation corresponding to the period of interruption is not displayed at the receiving external device 104.

In another scenario in which the communications link 110 is severed such that the media distribution device 102 no longer "sees" or recognizes the external device 104, the media distribution component may recognize the disruption and pause streaming of video part of a media presentation, and may additionally inform a user of the media presentation device 102 of the disconnect.

Consistent with further embodiments, a media distribution component may synchronize presentation of a video part and auxiliary data(s) part among different devices when the time span of the video part does not completely coincide with that of the auxiliary data part. The "time span" refers to the actual time interval or intervals during which a set of data was recorded. Thus, an action cam video sensor and co-located GPS and acceleration sensors (accelerometer) may record a skiing event in which the non-video sensors record continuously over a ten minute period, while the video sensor records for two separate three minute periods. Consistent with the present embodiments, media presentations treated by a media distribution component may be arranged such that all sets of recorded data including video data and auxiliary data may are time stamped and stored in a common file (media presentation) or associated files. In this manner, each video frame or accelerometer or GPS data entry is associated with a unique time. Moreover, all pieces of data or data entries that were recorded at the same time among multiple different recording devices receive a common time stamp. Accordingly, when the media presentation is directed for play back by a media distribution device, the media distribution component may cause a video part (which is sent to an external device) to be paused at a frame preceding a period corresponding to time stamps in which no video was recorded. At the same time, the presentation of successive time stamped GPS and/or accelerometer data may continue to be presented in a visual format on a local device over the time-stamped portion in which no video was recorded. Alternatively, a media consumption application may also provide visual notice of the video break and/or an option for a user to advance to the next recorded video frame or may automatically do so.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 11:
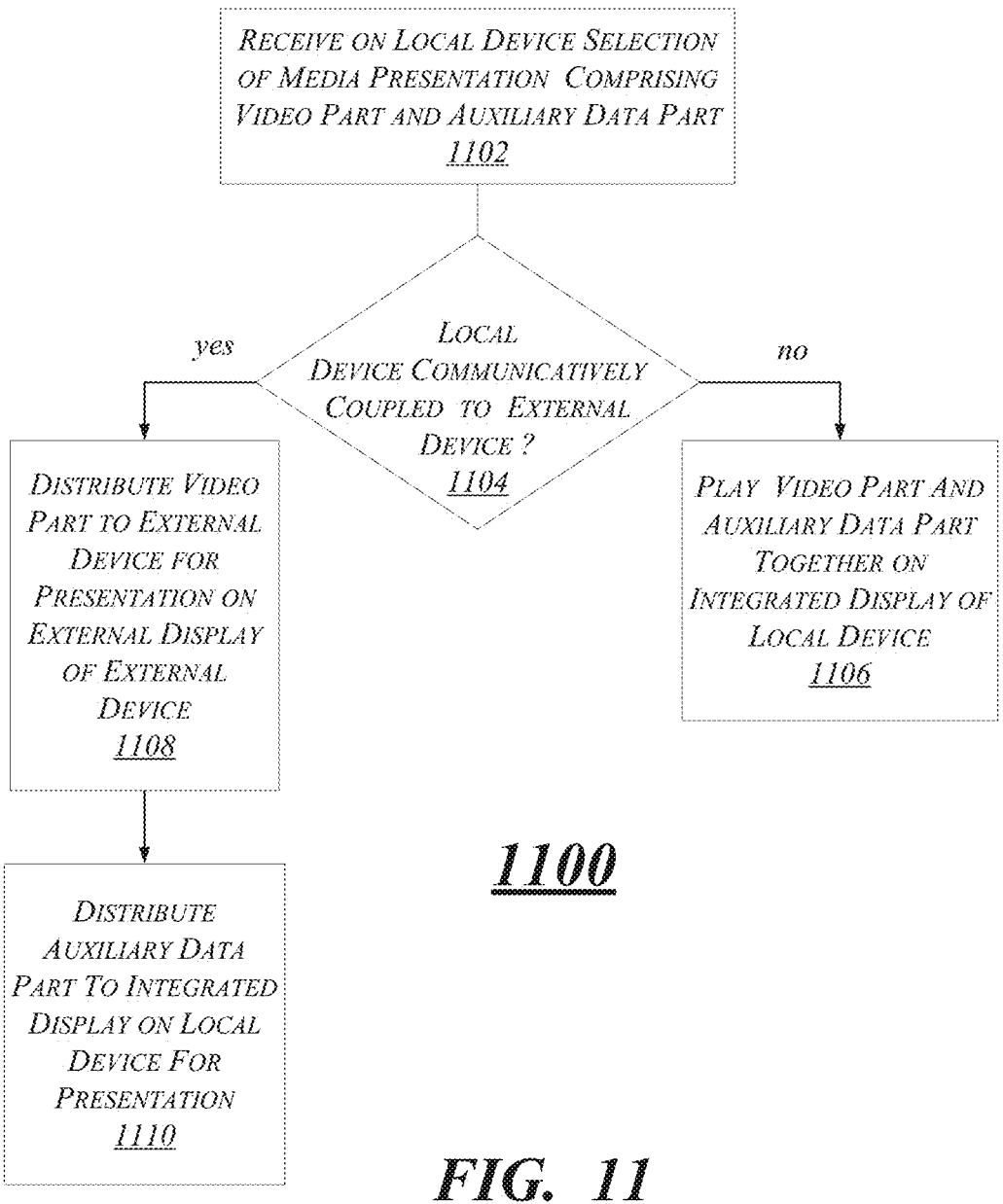
FIG. 11 presents an exemplary first logic flow.

FIG. 11 illustrates an exemplary first logic flow 1100. In some implementations, the first logic flow 1100 is performed by a media consumption application resident on a device such as a tablet computer, laptop computer, smartphone, or other device. At block 1102 a selection of a media presentation is received on a local device which may house the media consumption application. The media presentation includes a video part such as a video track and optional audio track, the media presentation further includes auxiliary data part such as one or more sets of sensor data.

At decision block 1104 a determination is made as to whether the local device is communicatively coupled to an external device. If not, the flow proceeds to block 1106 where the video part and auxiliary data part are played on an integrated display of the local device.

If the local device is communicatively coupled to an external device, the flow proceeds to block 1108, where the video part is distributed to an external display on an external device for presentation. The flow then proceeds to block 1110 where the auxiliary data part is distributed to an integrated display on the local device for presentation.

Figure 12:
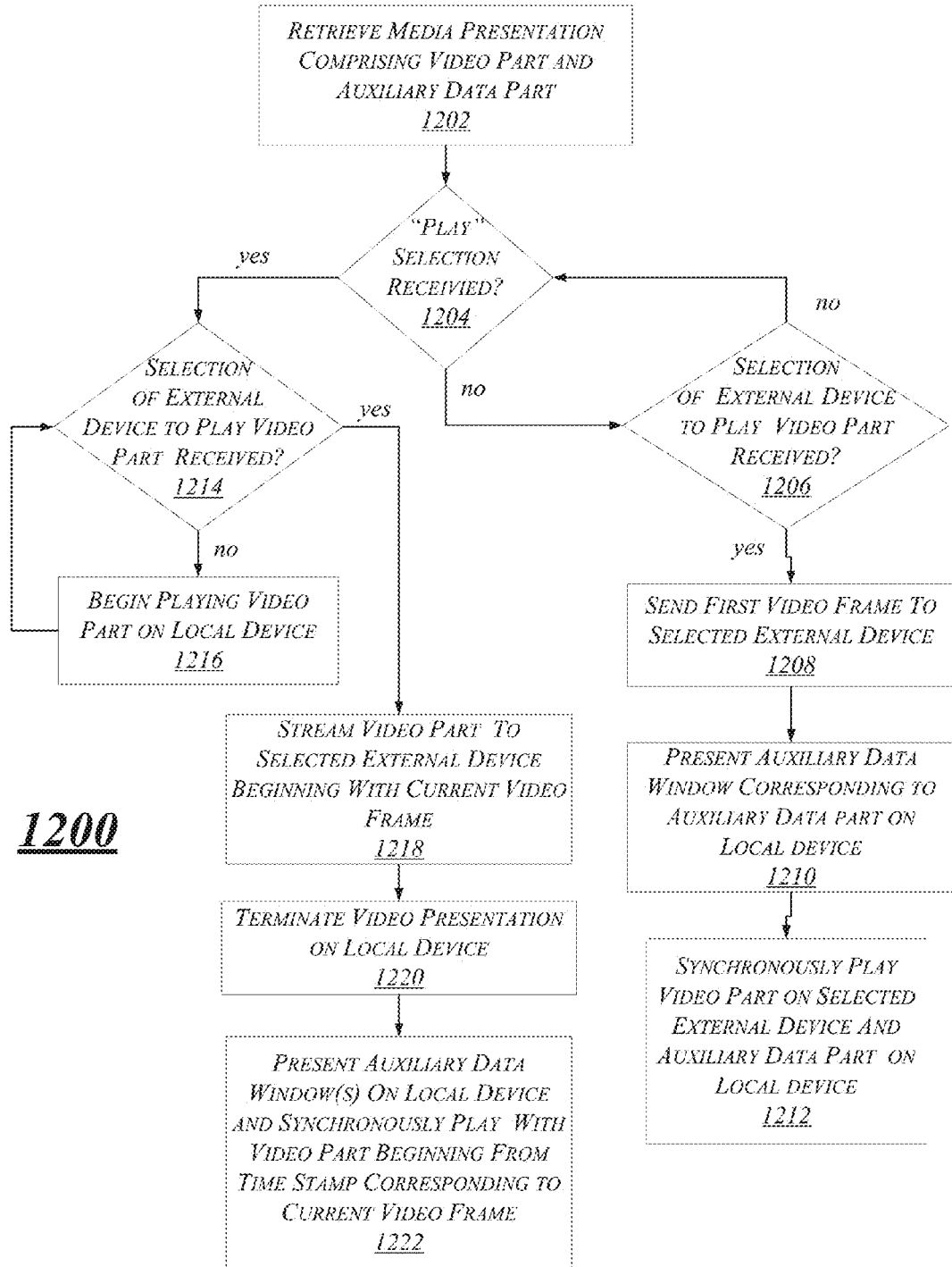
FIG. 12 presents an exemplary second logic flow.

FIG. 12 illustrates an exemplary second logic flow 1200. At block 1202 a media presentation that includes video and auxiliary data parts is retrieved. The flow proceeds to block 1204, where a determination is made as to whether a "play" operation has been invoked or selected. In one implementation, the selection of "play" may be provided through a user interface provided by a media consumption application to direct the distribution of the media presentation. If a selection of "play" has not been received, the flow moves to block 1206. At the block 1206 a determination is made as to whether a selection of an external device to play the video part has been received. If not, the flow returns to block 1204. If so, the flow proceeds to block 1208, where a first video frame of the video part is sent to the selected external device. The flow proceeds to block 1210 where an auxiliary data window corresponding to the auxiliary data part of the media presentation is presented on the local device. The flow then proceeds to block 1212 where the video part is played synchronously on the selected external device with the auxiliary data part on the local device. In some examples the synchronous playing entails playing the video on the external device while a marker advances within a sensor data window to indicate the value of sensor data recorded with the presently displayed video frame and to indicate the time stamp of the simultaneously recorded video frame and sensor data.

If at block 1204 it is determined that a selection to play the media presentation has been received, the flow proceeds to decision block 1214 where a determination is made as to whether a selection of an external device to play the video has been received. If not, the flow moves to block 1216 where the video part of the media presentation is played on the local device. The flow then returns to block 1214. If so, the flow moves to block 1218 where the video part is streamed to the selected external device beginning with the current video frame displayed on the local device. The flow then moves to block 1220 where the video presentation on the local device is stopped. The flow continues to block 1222 where an auxiliary data window(s) is presented on the local device and is synchronously played with the video part beginning from a time stamp corresponding to the current video frame.

Figure 13:
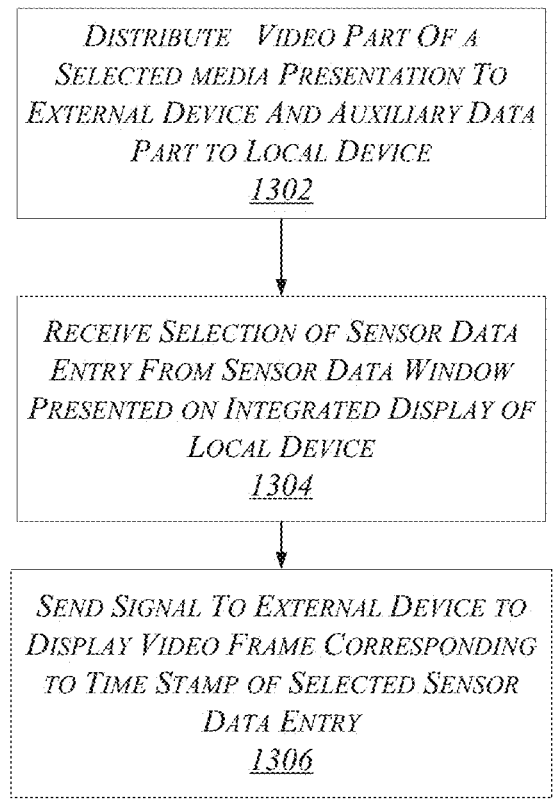
FIG. 13 presents an exemplary third logic flow.

FIG. 13 illustrates an exemplary third logic flow 1300. At block 1302 a video part of a selected media presentation is sent to an external device and an auxiliary data part of the media presentation sent to a local device. At block 1304 a selection of a sensor data entry is received from a sensor data window on the local device that represents at least a portion of the auxiliary data part of the media presentation. The flow then proceeds to block 1306 where a signal is sent to the external device to display a video frame corresponding to the time of the selected data entry.

Figure 14:
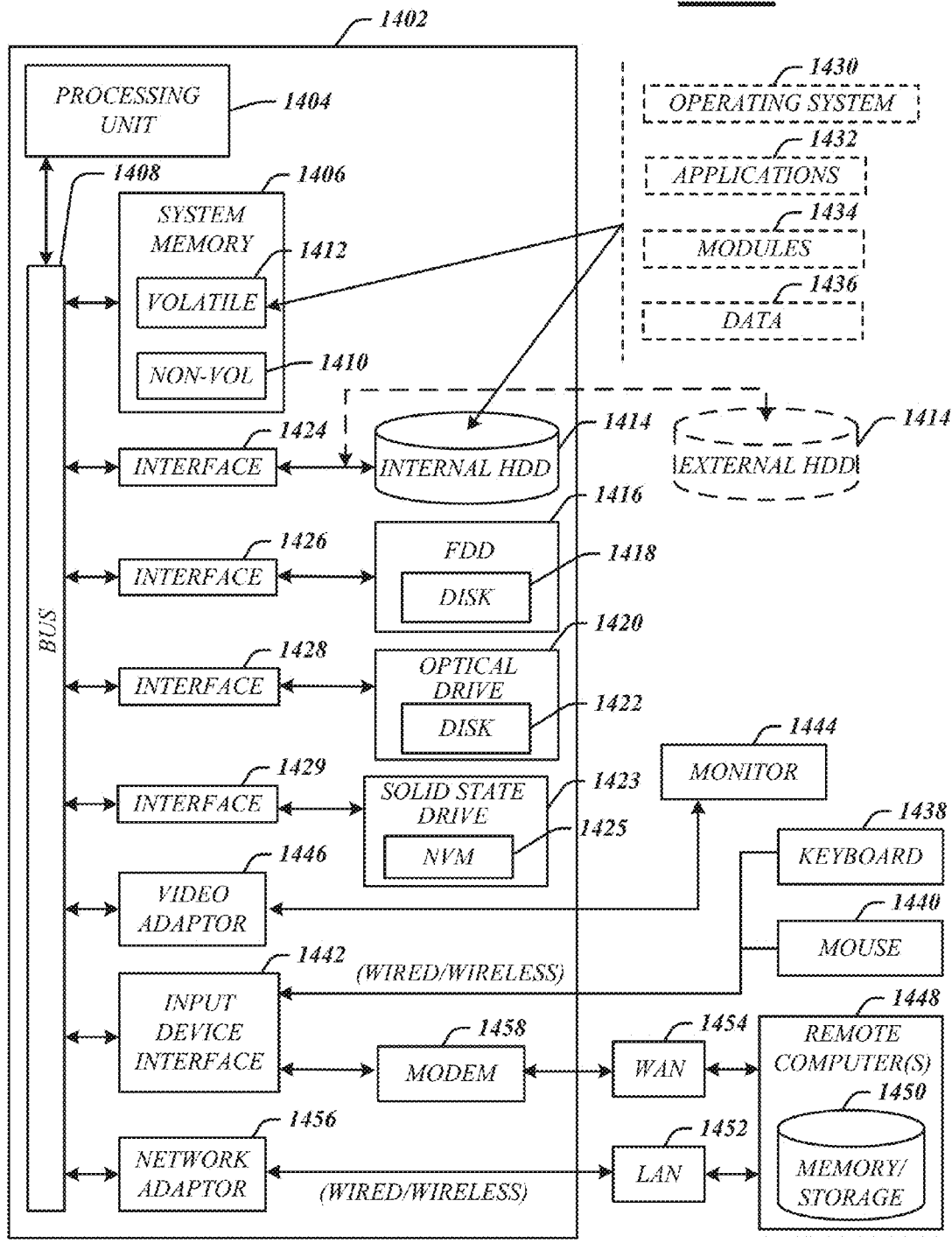
FIG. 14 is a diagram of an exemplary system embodiment.

FIG. 14 illustrates an embodiment of an exemplary computing architecture 1400 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1400 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1400 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors. Dual microprocessors and other multi-processor architectures may also be employed as the processing unit 1404. The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures.

The computing architecture 1400 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436.

A user can enter commands and information into the computer 1402 through one or more wire/wireless input devices, for example, a keyboard 1438 and a pointing device, such as a mouse 1440. Other input devices may include a microphone, an infra-red (IR) remote control, a joystick, a game pad, a stylus pen, touch screen, or the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The following examples pertain to further embodiments.

Example 1 is an apparatus that includes a processor circuit and a media distribution component for execution on the processor circuit to manage presentation of a media presentation on multiple electronic displays, the media presentation comprising a video part and an auxiliary data part, the auxiliary data part comprising sensor data corresponding to the video part, the media distribution component to manage presentation of the video part on an external display and the auxiliary data part on an integrated display.

In example 2 the media distribution component may optionally be for execution on the processor circuit to synchronize presentation of the auxiliary data part on the integrated display with presentation of the video part on the external display in response to a selection of the media presentation.

In example 3, the media distribution component of any of the examples 1-2 may optionally be for execution on the processor circuit to generate first signals to present a data window of at least one auxiliary data file of the auxiliary data part on the integrated display, and generate second signals to present one or more video frames of the video part on the external display, each video frame of the one or more video frames for simultaneous presentation with a data entry recorded with the video frame.

In example 4, the video part of any of the examples 1-3 may optionally include a video file recorded at an event and the auxiliary data part comprising a respective one or more sensor data files recorded during the event and/or a keyframe index generated from the one or more sensor data files.

In example 5, the auxiliary data part of any of the examples 1-4 may include accelerometer data, global position data, gyroscope data, altitude data, audio data, pressure data, temperature data, illumination data, and/or humidity data.

In example 6, the media distribution component of any of the examples 1-5 may optionally be T for execution on the processor circuit to forward the video part for wireless transmission.

In example 7, the apparatus of any of the examples 1-6 may include a user interface to transmit user input to the media distribution component, the user interface comprising a mouse, keyboard, keypad, touchpad, or touch screen.

In example 8, the video part of any of the examples 1-7 may include, comprising a video file having a plurality of video frames with each video frame having a time stamp, and the auxiliary part comprising a sensor data file having a plurality of sensor data entries each having a time stamp, the media distribution component may be for execution on the processor circuit to generate an auxiliary data window on the integrated display that presents the plurality of sensor data entries, receive a selection of a sensor data entry in the auxiliary data window corresponding to a given time stamp, and send a signal to the external display to display a video frame corresponding to the given time stamp.

In example 9, the media distribution component of any of the examples 1-8 may be for execution on the processor circuit to send a video stream comprising a plurality of video frames of the video part to the external display, and to generate a presentation of the auxiliary part data together with a marker of a data entry corresponding to a simultaneously presented video frame of the video stream on the integrated display.

In example 10, the media distribution component of any of the examples 1-9 may be for execution on the processor circuit to retrieve the media presentation from an external source in response to a selection of the media presentation.

In example 11, the media distribution component of any of the examples 1-10 may be for execution on the processor circuit to, in response to a selection of the media presentation, retrieve from an external source the auxiliary data part for presentation on the integrated display, and send a signal to the external source to transmit the video part to the external display.

In example 12, the media distribution component of any of the examples 1-11 may be for execution on the processor circuit to send a first portion of the video part to the integrated display in response to a user selection of the media presentation at a first instance, stream a second portion of the video part to the external display in response to a user selection of the external display at a second instance, and terminate streaming of the video part to the integrated display at onset of streaming the second portion of the video part to the external display, the second portion beginning with a video frame of the video part presented on the integrated display at about the second instance.

Example 13 includes at least one computer-readable storage medium comprising instructions that, when executed, cause a system to receive a selection of a media presentation comprising an auxiliary data part and video part corresponding to the auxiliary data part; send the auxiliary data part for presentation on an integrated display of a local device; and send the video part of the media presentation to an external display for presentation.

In example 14, the at least one computer-readable storage medium may optionally include instructions that, when executed, cause a system to synchronize presentation on the integrated display of the auxiliary data part with presentation of the video part at the external display in response to a selection of the media presentation.

In example 15, the at least one computer-readable storage medium of any of the examples 13-14 may optionally include instructions that, when executed, cause a system to receive a selection to play the media presentation, to send signals to play the video part on the integrated display, and to send signals to discontinue play of the video part on the integrated display responsive to receipt of the selection to send the video part to the external display In example 16, the at least one computer-readable storage medium of any of the examples 13-15 may optionally include instructions that, when executed, cause a system to: generate an auxiliary data window on the integrated display that presents a plurality of sensor data entries of an auxiliary data part; receive a selection of a sensor data entry in the auxiliary data window corresponding to a given time stamp; and send a signal for transmission to the external display to display a video frame corresponding to the given time stamp.

In example 17, the at least one computer-readable storage medium of any of the examples 13-16 may optionally include instructions that, when executed, cause a system to: receive a selection to send a video stream comprising a plurality of video frames of the video part to the external display; and generate on the integrated display a presentation of the auxiliary part data together with a marker of a data entry corresponding to a simultaneously presented video frame of the video stream.

In example 18, the at least one computer-readable storage medium of any of the examples 13-17 may optionally include instructions that, when executed, cause a system to retrieve the media presentation from an external source in response to a selection of the media presentation.

In example 19, the at least one computer-readable storage medium of any of the examples 13-18 may optionally include instructions that, when executed, cause a system to synchronize presentation by generating first signals to present at the integrated display a data window of at least one auxiliary data file of the auxiliary data part, and by generating second signals to present at the external display one or more video frames of the video part, each video frame of the one or more video frames for presentation simultaneously with presentation of a data entry that was recorded simultaneously with the each video frame.

In example 20, the at least one computer-readable storage medium of any of the examples 13-19 may optionally include instructions that, when executed, cause a system to, in response to a selection of the media presentation: retrieve from an external source the auxiliary data part for presentation on the integrated display; and send a signal to the external source to transmit the video part to the external display.

In example 21, the at least one computer-readable storage medium of any of the examples 13-20 may optionally include instructions that, when executed, cause a system to: send a first portion of the video part to the integrated display in response to a user selection of the media presentation at a first instance; stream a second portion of the video part to the external display in response to a user selection of the external display at a second instance; and terminate streaming of the video part to the integrated display at onset of streaming the second portion of the video part to the external display, the second portion beginning with a video frame of the video part presented on the integrated display at about the second instance.

Example 22 is a computer implemented method that includes receiving a selection of a media presentation comprising a video part and auxiliary data part, forwarding the auxiliary data part of the media presentation to a integrated display on a local device; and sending the video part of the media presentation to an external display, the auxiliary data part comprising data recorded concurrently with the video part.

In example 23, the computer implemented method of example 22 optionally includes synchronizing presentation on the integrated display of the auxiliary data part with presentation of the video part at the external display in response to a selection of the media presentation.

In example 24, the computer implemented method of any of examples 22-23 optionally includes synchronizing presentation by generating first signals to present at the integrated display a data window of at least one auxiliary data file of the auxiliary data part, generating second signals to present at the external display one or more video frames of the video part, and providing a time stamp for each video frame of the one or more video frames for simultaneous presentation with presentation of a data entry that was recorded simultaneously with the each video frame.

In example 25, the video part of any of examples 22-24 optionally includes a video file recorded at an event and the auxiliary data part comprising a respective one or more sensor data files recorded during the event and/or a keyframe index generated from the one or more sensor data files.

In example 26 the auxiliary data part of any of examples 22-25 optionally includes accelerometer data, global position data, gyroscope data, altitude data, audio data, pressure data, temperature data, illumination data, and/or humidity data.

In example 27, the computer implemented method of any of examples 22-26 optionally includes sending the video by wireless transmission to the external display.

In example 28, the video part of any of examples 22-27 optionally includes a video file having a plurality of video frames each video frame having a time stamp, the auxiliary part comprising a sensor data file having a plurality of sensor data entries each having a time stamp, the method optionally includes: generating an auxiliary data window on the integrated display that presents a plurality of sensor data entries of the auxiliary data part; receiving a selection of a sensor data entry in the auxiliary data window corresponding to a given time stamp; and sending a signal for transmission to the external display to display a video frame corresponding to the given time stamp.

In example 29, the computer implemented method of any of examples 22-28 optionally includes sending a video stream comprising a plurality of video frames of the video part to the external display; and generating on the integrated display a presentation of the auxiliary part data together with a marker of a data entry corresponding to a simultaneously presented video frame of the video stream.

In example 30, the computer implemented method of any of examples 22-29 optionally includes retrieving the media presentation from an external source in response to a selection of the media presentation.

In example 31, the computer implemented method of any of examples 22-30 optionally includes, in response to a selection of the media presentation: retrieving from an external source the auxiliary data part for presentation on the integrated display; and sending a signal to the external source to transmit the video part to the external display In example 32, the computer implemented method of any of examples 22-31 optionally includes: presenting a first portion of the video part to the integrated display in response to a user selection of the media presentation at a first instance; streaming a second portion of the video part to the external display in response to a user selection of the external display at a second instance; and terminating the presenting of the video part to the integrated display at onset of streaming the second portion of the video part to the external display, the second portion beginning with a video frame of the video part presented on the integrated display at about the second instance.

Example 33 is an apparatus to perform the method of any one of the examples 22-32.

Example 34 is a system that includes a user interface to receive a selection of a media presentation, the media presentation including a video part and a sensor data part; an integrated display to present the sensor data part of the media presentation, a communications interface to transmit the video part of the media presentation for display at an external display; a processor circuit; and a media distribution component for execution on the processor circuit to manage presentation of a media presentation on multiple electronic displays, the media presentation comprising a video part and an auxiliary data part, the auxiliary data part comprising sensor data corresponding to the video part, the media distribution component to manage presentation of the video part on an external display and the auxiliary data part on an integrated display.

In example 35, the media distribution component is optionally for execution on the processor circuit to synchronize presentation on the integrated display of the sensor data part with presentation of the video part at the external display in response to a selection of the media presentation.

In example 36 the media distribution component of any of the examples 33-35 is optionally for execution on the processor circuit to synchronize presentation by generating first signals to present at the integrated display a data window of at least one sensor data file of the sensor data part, and by generating second signals to present at the external display one or more video frames of the video part, each video frame of the one or more video frames for presentation simultaneously with presentation of a data entry that was recorded simultaneously with the each video frame.

In example 37 the sensor data part of any of the examples 33-36 is optionally accelerometer data, global position data, gyroscope data, altitude data, audio data, pressure data, temperature data, illumination data, and/or humidity data.

In example 38 the user interface of any of the examples 33-37 is optionally a mouse, keyboard, keypad, touchpad, or touch screen In example 39 the video part comprising of any of the examples 33-38 is optionally a video file having a plurality of video frames each video frame having a time stamp, the sensor data part comprising a sensor data file having a plurality of sensor data entries each having a time stamp, the media distribution component for execution on the processor circuit to generate a sensor data window on the integrated display that present the plurality of sensor data entries, receive a selection of a sensor data entry in the sensor data window corresponding to a given time stamp, and send a signal to the external display to display a video frame corresponding to the given time stamp.

In example 40, the media distribution component of any of the examples 33-39 is optionally for execution on the processor circuit to retrieve the media presentation from an external source in response to a selection of the media presentation.

In example 41, the media distribution component of any of the examples 33-40 is optionally for execution on the processor circuit to, in response to a selection of the media presentation, retrieve from an external source the sensor data part for presentation on the integrated display, and send a signal to the external source to transmit the video part to the external display.

In example 42, the media presentation of any of the examples 33-41 optionally includes a keyframe index derived from the sensor data part, the media distribution component is optionally for execution on the processor circuit to forward the keyframe index to the integrated display responsive to user input received at the user interface.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor circuit; and
a memory storing instructions for execution on the processor circuit, the instructions to:
manage presentation of a media presentation on multiple electronic displays, the media presentation comprising a video part and an auxiliary data part, the auxiliary data part comprising at least one of accelerometer data or altitude data, the video part comprising a video file having a plurality of video frames with each video frame having a video time stamp indicating a time at which the video frame was recorded, and the auxiliary data part comprising a sensor data file having a plurality of sensor data entries with each sensor data entry having a sensor time stamp and a keyframe index, the keyframe index to include a listing of select frames of the video part that correspond to one or more portions of the sensor data;
manage presentation of the video part on an external display and the auxiliary data part on an integrated display;
generate first signals to present a data window with a sensor data entry of the plurality of sensor data entries on the integrated display, the data window to include a marker, the marker positioned within the data window based on the sensor data entry and a sensor time stamp associated with the sensor data entry and corresponding to a video time stamp associated with a current video frame;
receive input moving the marker from a first position to a second position, the first and second positions corresponding to a first and a second sensor data entry, of the plurality of sensor data entries, respectively; and present, on the external display responsive to the received input, a first video frame of the plurality of video frames having a video time stamp associated with the sensor time stamp of the second sensor data entry.

2. The apparatus of claim 1, the memory storing instructions for execution on the processor circuit to synchronize presentation of the auxiliary data part on the integrated display with presentation of the video part on the external display in response to a selection of the media presentation.

3. The apparatus of claim 1, the memory storing instructions for execution on the processor circuit to generate second signals to present one or more video frames of the video part on the external display, each video frame of the one or more video frames for simultaneous presentation with a data entry recorded with the video frame.

4. The apparatus of claim 1, the video part comprising a video file recorded at an event and the auxiliary data part comprising a respective one or more sensor data files recorded during the event.

5. The apparatus of claim 1, the auxiliary data part comprising at least one of global position data, gyroscope data, audio data, pressure data, temperature data, illumination data, or humidity data.

6. The apparatus of claim 1, the memory storing instructions for execution on the processor circuit to forward the video part for wireless transmission.

7. The apparatus of claim 1, comprising a user interface to receive the input from a user, the user interface comprising a mouse, keyboard, keypad, touchpad, or touch screen, the external display to present a second video frame of the plurality of video frames having a video time stamp associated with the sensor time stamp of the first sensor data when the marker is at the first position.

8. The apparatus of claim 1, the memory storing instructions for execution on the processor circuit to generate an auxiliary data window on the integrated display that presents the plurality of sensor data entries, receive a selection of a sensor data entry in the auxiliary data window corresponding to a given time stamp, and send a signal to the external display to display a video frame corresponding to the given time stamp.

9. The apparatus of claim 1, the memory storing instructions for execution on the processor circuit to send a video stream comprising a plurality of video frames of the video part to the external display, and to generate a presentation of the auxiliary part data corresponding to a simultaneously presented video frame of the video stream on the integrated display.

10. The apparatus of claim 1, the memory storing instructions for execution on the processor circuit to retrieve the media presentation from an external source in response to a selection of the media presentation.

11. The apparatus of claim 1, the memory storing instructions for execution on the processor circuit to, in response to a selection of the media presentation, retrieve from an external source the auxiliary data part for presentation on the integrated display, and send a signal to the external source to transmit the video part to the external display.

12. The apparatus of claim 1, the memory storing instructions for execution on the processor circuit to send a first portion of the video part to the integrated display in response to a user selection of the media presentation at a first instance, stream a second portion of the video part to the external display in response to a user selection of the external display at a second instance, and terminate streaming of the video part to the integrated display at onset of streaming the second portion of the video part to the external display, the second portion beginning with a video frame of the video part presented on the integrated display at about the second instance.

13. At least one non-transitory computer-readable storage medium comprising instructions that, when executed by a processor, cause a system to:
receive a selection of a media presentation comprising an auxiliary data part and video part corresponding to the auxiliary data part, the auxiliary data part comprising at least one of accelerometer data or altitude data, the video part to comprise a video file having a plurality of video frames with each video frame having a video time stamp indicating a time at which the video frame was recorded, and the auxiliary data part to comprise a sensor data file having a plurality of sensor data entries with each sensor data entry having a sensor time stamp and a keyframe index, the keyframe index to include a listing of select frames of the video part that correspond to one or more portions of the sensor data;
send the auxiliary data part for presentation on an integrated display of a local device; and
send the video part of the media presentation to an external display for presentation;
generate an auxiliary data window on the integrated display that presents a sensor data entry of the plurality of sensor data entries, the auxiliary data window to include a marker positioned within the data window based on the sensor data entry and a sensor time stamp associated with the sensor data entry and corresponding to a video time stamp associated with a current video frame; receive input moving the marker from a first position to a second position, the first and second positions corresponding to a first and a second sensor data entry, of the plurality of sensor data entries, respectively; and
present, on the external display responsive to the received input, a first video frame of the plurality of video frames having a video time stamp associated with the sensor time stamp of the second sensor data entry.

14. The at least one non-transitory computer-readable storage medium of claim 13 comprising instructions that, when executed, cause a system to synchronize presentation on the integrated display of the auxiliary data part with presentation of the video part at the external display in response to a selection of the media presentation.

15. The at least one non-transitory computer-readable storage medium of claim 13 comprising instructions that, when executed, cause a system to receive a selection to play the media presentation, to send signals to play the video part on the integrated display, and to send signals to discontinue play of the video part on the integrated display responsive to receipt of the selection to send the video part to the external display.

16. The at least one non-transitory computer-readable storage medium of claim 13 comprising instructions that, when executed, cause a system to:
generate an auxiliary data window on the integrated display that presents the plurality of sensor data entries;
receive a selection of a sensor data entry in the auxiliary data window corresponding to a given time stamp; and
send a signal for transmission to the external display to display a video frame corresponding to the given time stamp.

17. The at least one non-transitory computer-readable storage medium of claim 13 comprising instructions that, when executed, cause a system to:
receive a selection to send a video stream comprising a plurality of video frames of the video part to the external display; and
generate on the integrated display a presentation of the auxiliary part data corresponding to a simultaneously presented video frame of the video stream.

18. The at least one non-transitory computer-readable storage medium of claim 13 comprising instructions that, when executed, cause a system to retrieve the media presentation from an external source in response to a selection of the media presentation, the external display to present a second video frame of the plurality of video frames having a video time stamp associated with the sensor time stamp of the first sensor data when the marker is at the first position.

19. The at least one non-transitory computer-readable storage medium of claim 13 comprising instructions that, when executed, cause a system to synchronize presentation by generating first signals to present at the integrated display a data window of at least one auxiliary data file of the auxiliary data part, and by generating second signals to present at the external display one or more video frames of the video part, each video frame of the one or more video frames for presentation simultaneously with presentation of a data entry that was recorded simultaneously with the each video frame.

20. The at least one non-transitory computer-readable storage medium of claim 13 comprising instructions that, when executed, cause a system to, in response to a selection of the media presentation:
retrieve from an external source the auxiliary data part for presentation on the integrated display; and
send a signal to the external source to transmit the video part to the external display.

21. A computer implemented method, comprising:
receiving a selection of a media presentation comprising a video part and an auxiliary data part, the auxiliary data part comprising at least one of accelerometer data or altitude data, the video part comprising a video file having a plurality of video frames with each video frame having a video time stamp indicating a time at which the video frame was recorded, and the auxiliary data part comprising a sensor data file having a plurality of sensor data entries with each sensor data entry having a sensor time stamp and a keyframe index, the keyframe index to include a listing of select frames of the video part that correspond to one or more portions of the sensor data;
forwarding the auxiliary data part of the media presentation to an integrated display on a local device;
sending the video part of the media presentation to an external display, the auxiliary data part comprising data recorded concurrently with the video part;
generating an auxiliary data window on the integrated display that presents a sensor data entry of the plurality of sensor data entries, the auxiliary data window to include a marker positioned within the data window based on the sensor data entry and a sensor time stamp associated with the sensor data entry and corresponding to a video time stamp associated with a current video frame;
receiving input moving the marker from a first position to a second position, the first and second positions corresponding to a first and a second sensor data entry, of the plurality of sensor data entries, respectively; and
presenting, on the external display responsive to the received input, a first video frame of the plurality of video frames having a video time stamp associated with the sensor time stamp of the second sensor data entry.

22. The computer implemented method of claim 21, comprising:
synchronizing presentation on the integrated display of the auxiliary data part with presentation of the video part at the external display in response to a selection of the media presentation, the external display to present a second video frame of the plurality of video frames having a video time stamp associated with the sensor time stamp of the first sensor data when the marker is at the first position.

23. The computer implemented method of claim 21, comprising:
receiving a selection of a sensor data entry in the auxiliary data window corresponding to a given time stamp; and
sending a signal for transmission to the external display to display a video frame corresponding to the given time stamp.

24. The computer implemented method of claim 21, comprising:
retrieving the media presentation from an external source in response to a selection of the media presentation.

25. The computer implemented method of claim 21, comprising, in response to a selection of the media presentation,
retrieving from an external source the auxiliary data part for presentation on the integrated display; and
sending a signal to the external source to transmit the video part to the external display.

* * * * *